United States Patent [19]

De Leonibus et al.

[11] Patent Number: 5,242,528
[45] Date of Patent: Sep. 7, 1993

[54] APPARATUS FOR THE GLUEING OF METAL BASES ON GLASS SUBSTRATES

[75] Inventors: Vittore De Leonibus; Carmine Pascale, both of Vasto, Italy

[73] Assignee: Societa Italiana Vetro - SIV S.p.A., Salvo, Italy

[21] Appl. No.: 356,326

[22] Filed: May 23, 1989

[30] Foreign Application Priority Data

May 23, 1988 [IT] Italy ................ 48003 A/88

[51] Int. Cl.⁵ ................................ B32B 31/00
[52] U.S. Cl. .................... 156/538; 156/556; 156/557; 156/566
[58] Field of Search ............ 156/556, 566, 364, 309.9, 156/322, 538, 557, 297

[56] References Cited

U.S. PATENT DOCUMENTS

| | | | |
|---|---|---|---|
| 3,704,883 | 12/1972 | Don | 156/556 X |
| 3,948,719 | 4/1976 | Beckham | |
| 4,217,992 | 8/1980 | Timmons et al. | |
| 4,493,743 | 1/1985 | Lunding | 156/556 X |
| 4,793,878 | 12/1988 | Giorgio et al. | 156/364 X |

FOREIGN PATENT DOCUMENTS 2064506 6/1981 United Kingdom .

*Primary Examiner*—Thi Dang
*Attorney, Agent, or Firm*—Wenderoth, Lind & Ponack

[57] ABSTRACT

An apparatus, formed by a plurality of devices, permits the automatic glueing of metal bases onto glass windscreens for automobiles. The apparatus is formed by a device for loading the windscreen, a centering device, a device for the hot glueing of a base, and devices for the automatic feeding of the bases. Devices for the unloading of the windscreen and for the supply of bases also form a part of the same apparatus.

7 Claims, 5 Drawing Sheets

APPARATUS FOR THE GLUEING OF METAL BASES ON GLASS SUBSTRATES

BACKGROUND OF THE INVENTION

1. Field of the Invention

The present invention refers to an apparatus formed by a plurality of devices connected one to the other and to a common supporting structure, particularly suited for the automatic glueing of metal bases on glass substrates.

In the field of manufacture of car windows, and in particular front windscreens, some additional operations are sometimes required to render the windscreen usable on an automobile.

One of these operations consists in the application by means of glueing of metal bases, suitable for supporting the rear view mirrors.

2. Description of the Prior Art

At present the rear view mirrors are applied directly onto the windscreen of an automobile by means of a coupling which connects the stem of the mirror to a metal base previously applied on the windscreen by means of glueing.

In this manner the operation of mounting the rear view mirrors was divided into two stages: the first takes place in the factory in which the windscreen is manufactured and consists in the glueing of the bearing base onto the glass; the second takes place on the production line of the automobile, and consists in the application of the mirror to the base.

Obviously the stage of fixing the base in a production line for the manufacture of windscreens creates problems in work organization, production speeds and in the quality of the finished product, and therefore also in the final cost of the product.

It is necessary, in fact, to add to a complex production line another group of operations which can cause undesired slowing of the production speed and increased production rejects.

SUMMARY OF THE INVENTION

The object of the present invention is to provide an apparatus which, inserted in a suitable phase of the production line of the windscreen, is able to overcome the problems mentioned above.

A further object of the present invention is to provide an automatic machine of simple and economic construction which does not require specialized operators or complex technology for its running.

This and other objects are achieved by an apparatus for the glueing of metal bases on a glass substrate, characterized by the fact of comprising means for the loading of the glass substrates, means for their precise positioning, means for the glueing of the metal base on the substrate, and means for the feeding of the bases to said glueing means, said means all being connected one to the other and to a common supporting structure, and means for the storing and feeding of the bases, the storing and feeding means being suitably connected to the abovementioned means for feeding the bases.

BRIEF DESCRIPTION OF THE DRAWINGS

Further characteristics and advantages of the invention will be further clarified by the description of a preferred, but not exclusive, embodiment of the automatic apparatus for the glueing of bases, illustrated in a non-limitative manner in the enclosed drawings, in which.

DESCRIPTION OF THE PREFERRED EMBODIMENT

Figure 1:
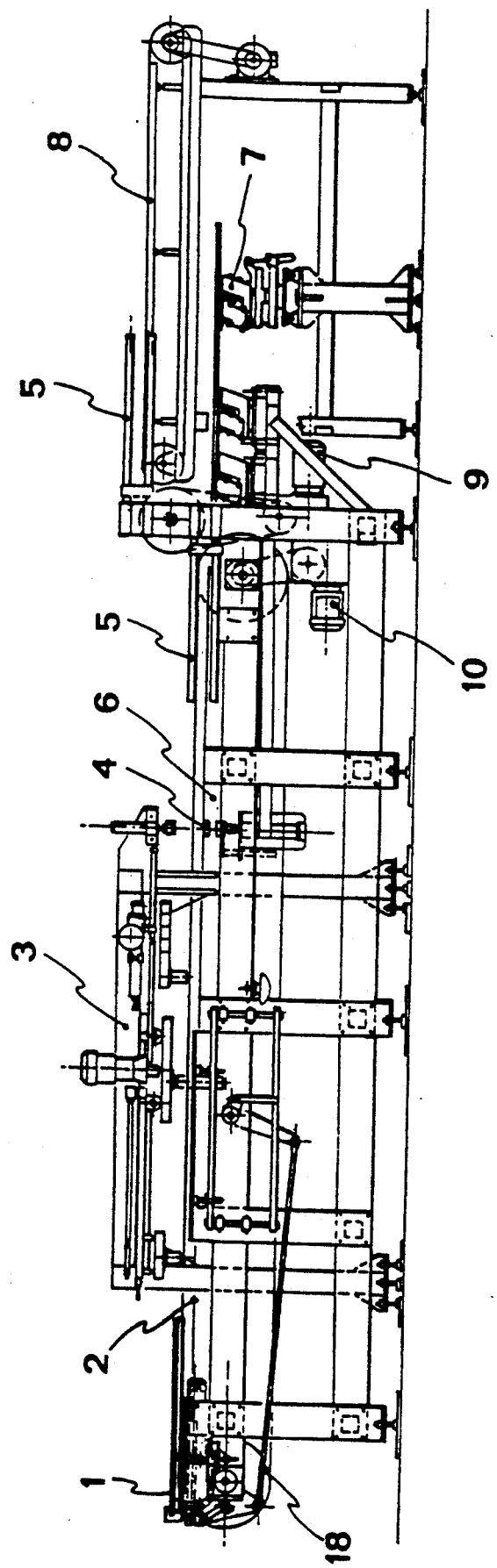
FIG. 1 is a schematic side view of the apparatus according to the present invention.

With reference to FIG. 1, the automatic apparatus for glueing bases comprises, connected one to the other by means of conveyor belts 2, a device for the automatic loading of the sheets of glass, a device 3 for centering and exact positioning, a glueing device 4, and a device having feeding channels 6 for feeding the bases.

The apparatus comprises a swinging and rotating device 7 for the feeding of bases. A storing device for the bases, perpendicular to the plane of the drawing, is not represented in FIG. 1, being however illustrated in FIG. 5.

A geared motor 9 commanding the loader 1 and a variable speed motor 10 commanding the conveyor belts 2 are placed, for reasons of bulk, below the feeding channels 6 for the bases.

The automatic loading device 1 takes a sheet of glass and places it on the conveyor belts 2. These carry the sheet to the centering station 3, where mechanical stop means provide for the final positioning thereof so as to present it to the glueing station 4 in a precise position.

After the glueing of the base has taken place, the sheet of glass is moved towards the right-hand end in FIG. 1 for removal.

Figure 2:
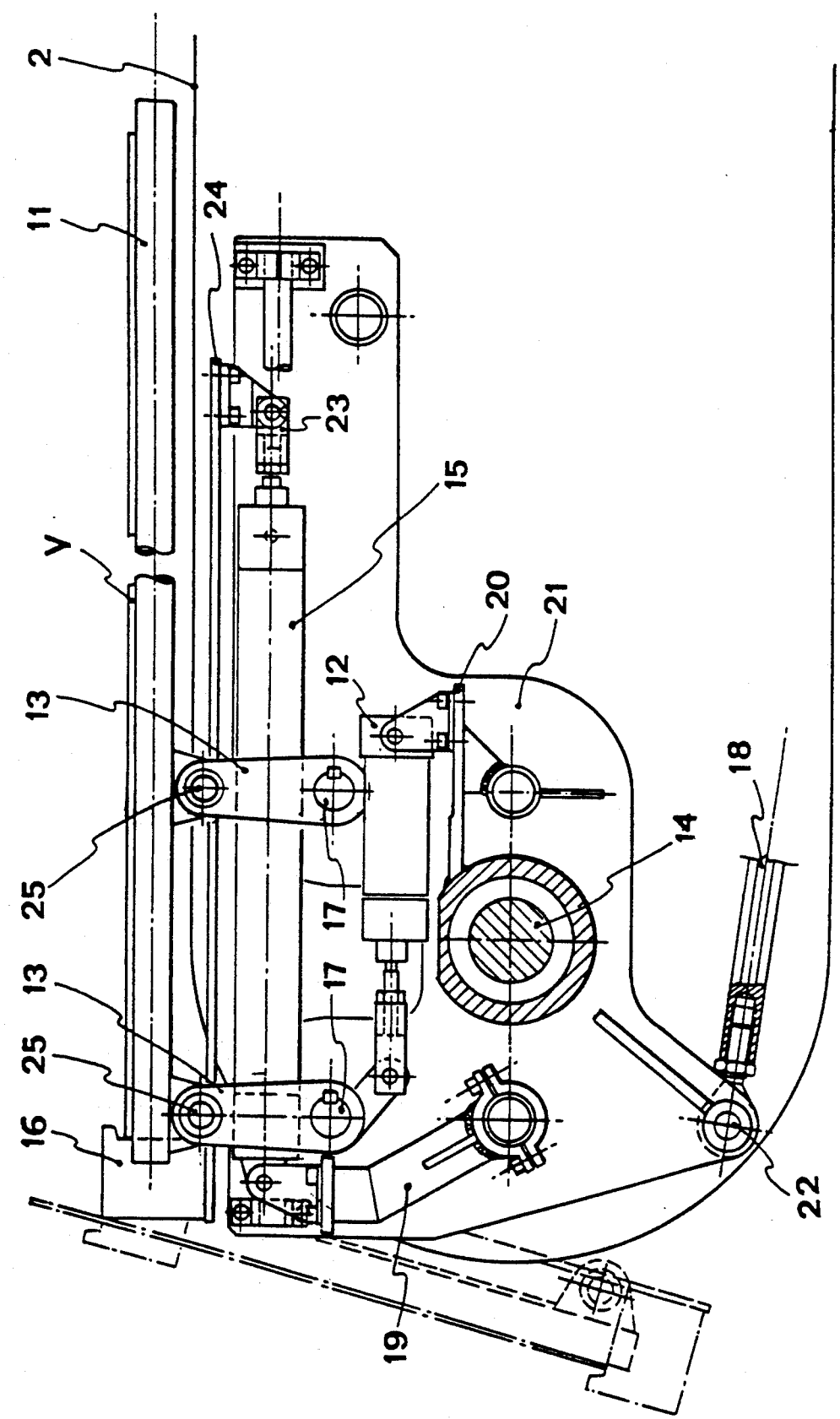
FIG. 2 is a side view of a loading device for sheets of glass.

With reference to FIG. 2, the automatic loading device 1 comprises arms 11 bearing sheet of glass V, hinged to brackets 13 by means of hinges 25. The brackets 13 are also hinged to a support 20 welded to the body of a tilting device 21, and they are connected at their other end to the shaft of horizontal piston 12, which is in turn fixed to the support 20.

The tilting device 21 is hinged to an axle 14 and by means of a pin 22 to a linkage 18.

An arm 19, bolted onto the body of the tilting device 21, bears on its upper free end a horizontal piston 15, on the rod 23 of which a bar 24 is fixed which bears a support 16.

The sheet of glass V is picked up by the arms 11 in a near-vertical position (shown with dashed lines) and placed on the conveyor belts 2 by effect of the rotational movement of the tilting device 21 around the axle 14 under the control of linkage 18.

The arms 11 deposit the sheet of glass V on the conveyors 2 due to rotation of the brackets 13 around the hinges 25 and 17.

The piston 15 controls the stroke of the bar 24 in such a way as to regulate the height of the support 16 according to the dimensions of the sheet of glass to be loaded.

Figure 3:
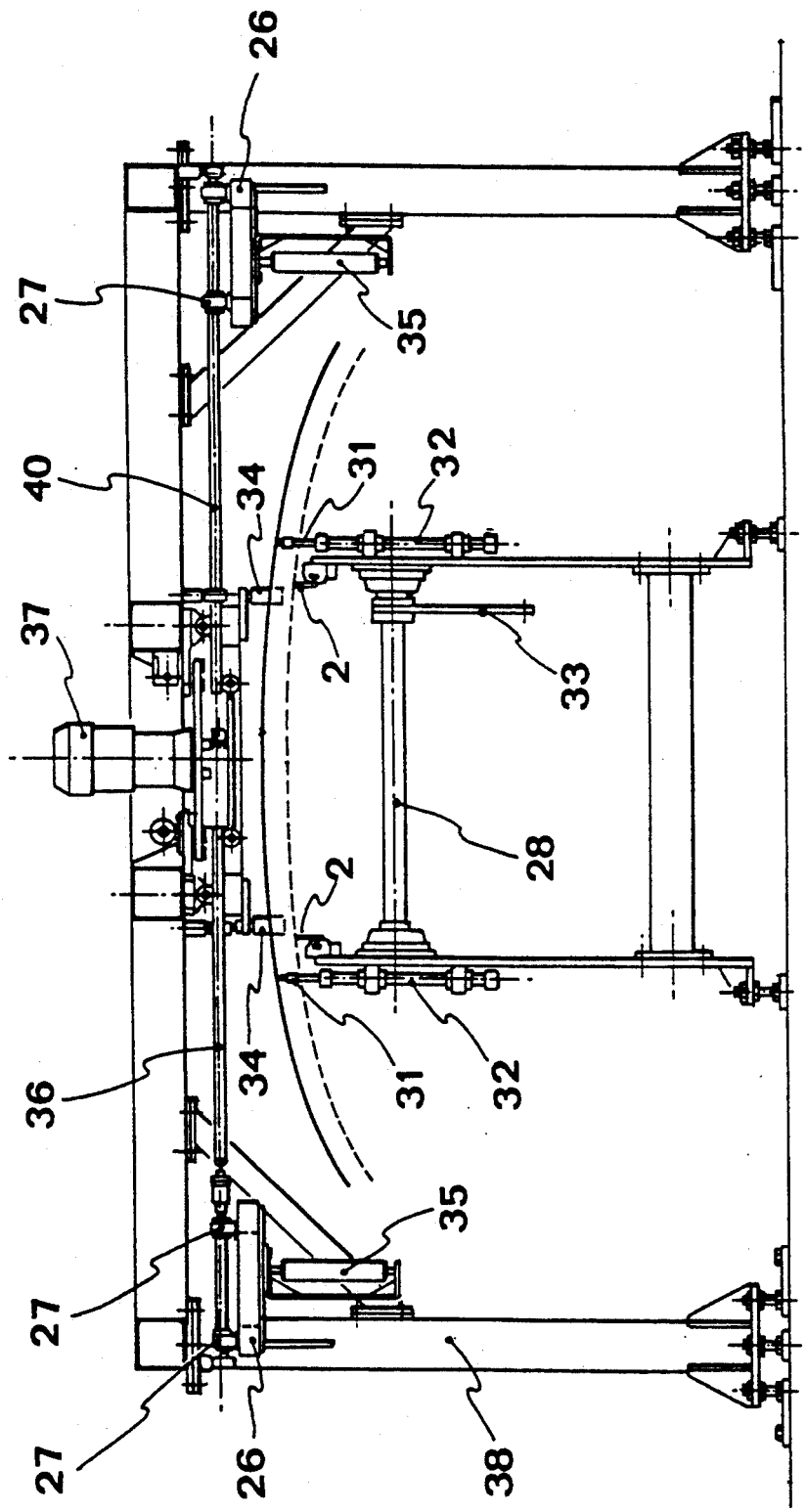
FIG. 3 is a view, on a plane orthogonal to the direction of movement of the sheet of glass, of a device for positioning the sheet of glass.

With reference to FIG. 3, a linkage 33 is connected to a shaft 28, which is in turn connected to shafts 32, having on their upper part glass-bearing shoes 31.

A pair of front stops 34, suitably covered so as not to damage the edge of the sheet of glass, is positioned in the direction of motion of the glass and is shown in its position blocking the sheet of glass.

The sheet of glass moves to lie against the stops.

Two side stops 35, also suitably covered so as not to damage the edge of the sheet, are placed on the two sides of the sheet and supported by plates 26 and slidable supports 27.

The side stops are connected respectively to a rack 36 and to a sliding shaft 40.

The rack 36 is engaged with a pinion, not shown in the figure, of a motor 37, in turn mounted on a frame 38.

On arriving in correspondence with the precision positioning station 3, the sheet of glass V is lifted from the belts 2 by means of the shoes 31 and abutted against the front mechanical stops 34. Note that the glass V is centered on the shoes 31 and the front mechanical stops 34. Also note that the belts 2 extend at parallel positions with the central area between the two belts 2 open.

The side stops 35, together with another pair of mechanical stops at the back, not shown in the figure, hold the sheet of glass between themselves and set the sheet, which can slide on the shoes 31 (two of which are not shown in the figure), in the precise and final position for the following operation of glueing the bases.

Figure 4:
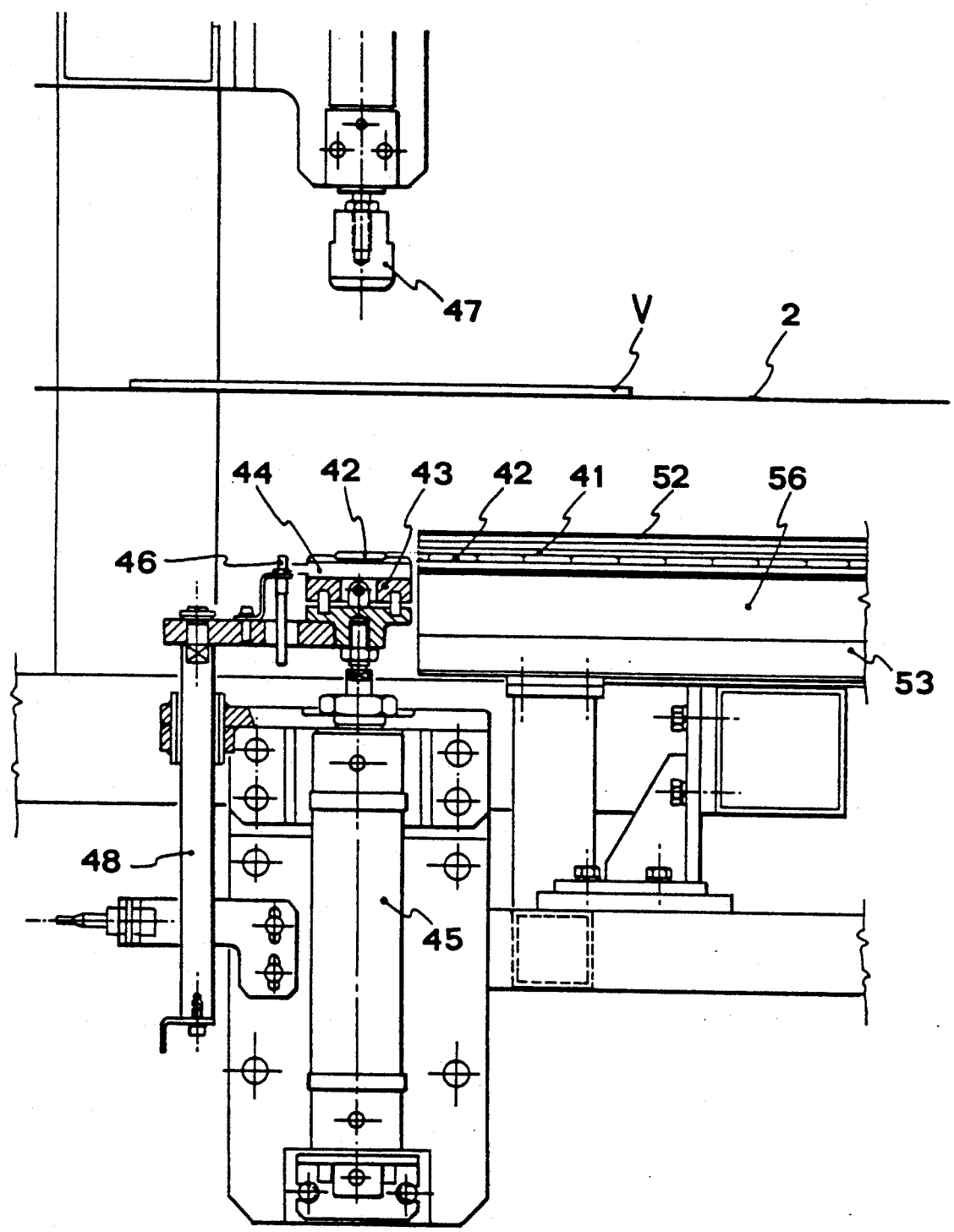
FIG. 4 is a section view of a device for glueing the bases and of a base feeder.

With reference to FIG. 4, a piston 45 carries on the free extremity of its rod a base-bearing head 43 in which a base 42 to be glued is inserted.

The head 43 is kept at a suitable temperature by an electric resistor 44.

Adjacent to the head 43 a heated channel 41 is situated, in which the bases 42 slide due to the effect of vibrations generated by an electromagnetic vibrator indicated at 77.

The bases 42 to be glued have, on their contact surface, a thin layer of adhesive, preferably of a vinylic based type.

The channel 41 is kept at a suitable temperature by means of heating plates 56 and an insulation 53, preferably of glass wool. A transparent cover 52 avoids the dispersion of heat and at the same time allows the movement of the bases towards the glueing head 43 to be followed visually.

A sensor 46 is placed in such a way that its sensing end is on the same plane as the base 42 inserted on the head 43.

A counterpressure piston 47 is placed in the upper part of the station, on the opposite side from the sheet of glass V and the belts 2.

A counterrotating shaft 48 is rigidly connected to the base-bearing head 43.

When the sheet of glass V reaches the station for glueing the bases, the piston 45 lifts the head 43 containing the base 42 towards the glass V.

The base comes from the heated channel 41 and was made to fall into a recess provided in the head 43 through the pushing of a piston (not shown in the drawings) placed orthogonally to the plane of FIG. 4.

The lifting movement of the piston 45 is stopped by the sensor 46 sensing the presence of a sheet of glass. The piston 45 can be moved directly up to the sheet of glass since there is no interference from the belts 2, the belts 2 extending along sides of the glass V with a central portion open.

The shaft 48 follows the base-holder 43 in its upward movement, preventing its rotation and at the same time forcing the counterpressure piston to descend to block the sheet of glass V.

The glueing operation then takes place by pressing together the bases 42 and the thin layer of adhesive, which is at a suitable temperature, on the sheet of glass V.

Figure 5:
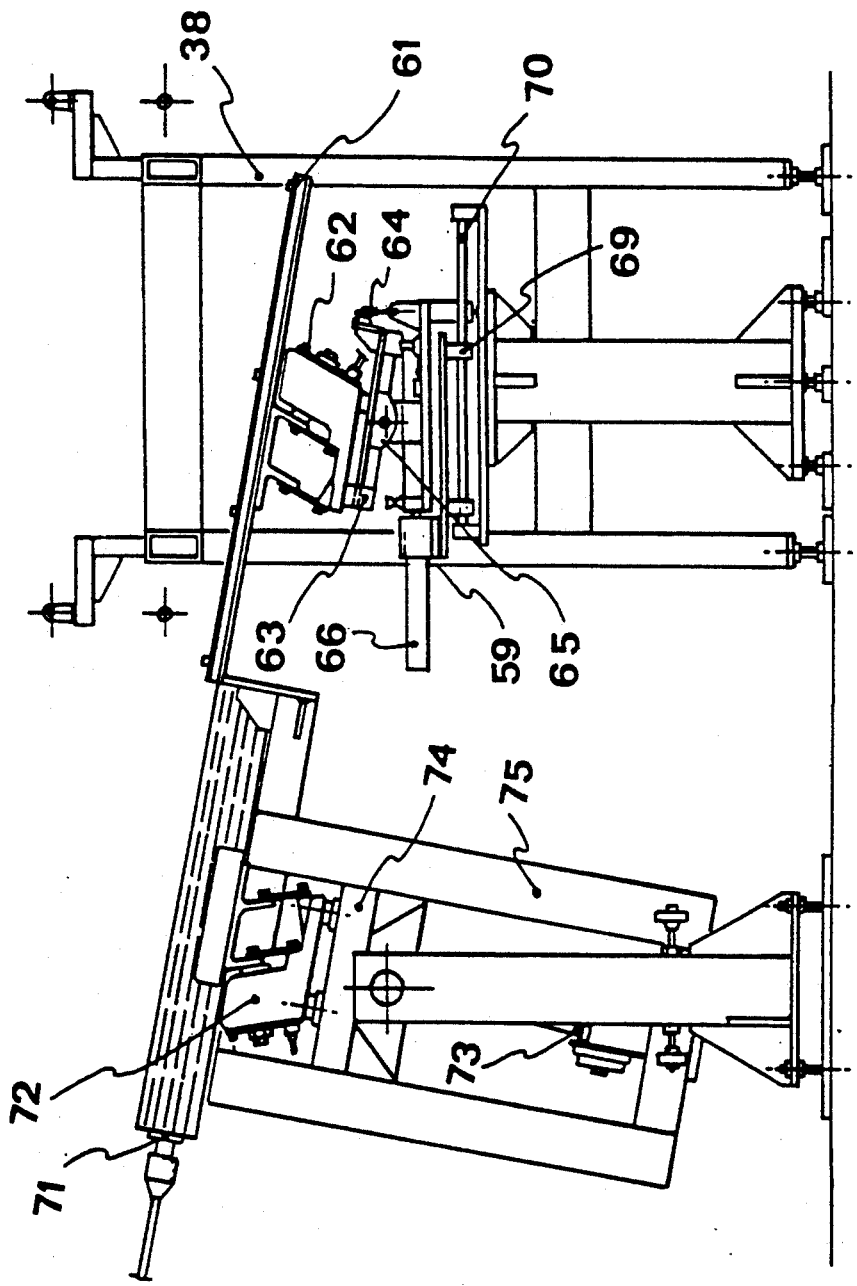
FIG. 5 is a side view of the device for storing and feeding the bases.

With reference to FIG. 5, a swinging channel 61 is supported on an electromagnetic vibrator 62, in turn connected to a swinging support 63, hinged to a horizontal rotation axis 65.

The inclination of the swinging support 63 is controlled by the operation of the rod of a piston 64.

A horizontal piston 66, is fixed to a support 59, and its rod bears bases 69 sliding along an axle 70.

A tank 71 for the bases is connected to an electromagnetic vibrator 72. This is placed on a table 74, slidable along an axis orthogonal to the tank and connected to an electric lifting piston 73.

The tank 71 is formed by a suitable number of containers, placed in superposed relationship in such a way as to contain an adequate number of metal bases.

A frame 75 supports the whole complex and the tank 71 for the bases.

The swinging channel 61 is set in line with the base tank 71 and the upwards or downwards stroke of the table 74 allows the alignment of one of a number of loaded containers with the channel 61.

The bases descend by gravity from the tank and by vibration along the channel 61 and arrive, when the channel 61 rotates about its vertical axis by 90°, at the heated channel 41.

Driven by the vibrations, the bases 42 are brought to the base glueing device.

It will thus be seen that the objects set forth above are efficiently attained and, since certain changes may be made in the above construction without departing from the spirit and scope of the invention, it is intended that all matter contained in the above description or shown in the accompanying drawings shall be interpreted as illustrative and not in a limiting sense.

We claim:

1. In an apparatus for glueing metal bases onto a sheet of glass, which includes a loading station for loading a sheet of glass onto the apparatus, a precision positioning stationing for precisely positioning the sheets of glass for glueing, a glueing means for glueing the metal bases onto the sheets of glass and a means for feeding the metal bases to said glueing means, said glueing means comprises:
   a bearing head for supporting a metal base to be glued;
   a first piston having a piston rod, said piston rod carrying said bearing head on a free end thereof, and said piston rod being movable by said piston between a first position for receiving a metal base on said bearing head and a second position whereat the metal base is glued onto a sheet of glass; and
   a counter pressure piston disposed opposite said first piston for providing counter pressure on the opposite side of a sheet of glass from the side on which a metal base is being glued by said first piston at said second position;
   wherein said bearing head has an electric resistor for maintaining a metal base on said bearing head at a suitable glueing temperature.

2. In an apparatus for glueing metal bases onto a sheet of glass, which includes a loading station for loading a sheet of glass onto the apparatus, a precision positioning stationing for precisely positioning the sheets of glass for glueing, a glueing means for glueing the metal bases onto the sheets of glass and a means for feeding the metal bases to said glueing means, said glueing means comprises:
- a bearing head for supporting a metal base to be glued;
- a first piston having a piston rod, said piston rod carrying said bearing head on a free end thereof, and said piston rod being movable by said piston between a first position for receiving a metal base on said bearing head and a second position whereat the metal base is glued onto a sheet of glass; and
- a counter pressure piston disposed opposite said first piston for providing counter pressure on the opposite side of a sheet of glass from the side on which a metal base is being glued by said first piston at said second position;

wherein said means for feeding the metal bases to said glueing means comprises:
- a heated vibrating channel extending to said bearing head and an electromagnetic vibrator for vibrating said heated vibrating channel to move metal bases in said channel to said bearing head by vibration;
- a swinging and rotating channel for feeding metal bases to said heated vibrating channel, said swinging and rotating channel being pivotably mounted about a vertical axis and a horizontal axis; and
- a tank comprised of a plurality of superposed containers for metal bases, said tank being disposable at an inclined plane for gravity feed of the metal bases to said swinging and rotating channel, and said tank having a metal base feed direction substantially perpendicular to said heated vibrating channel, whereby said swinging and rotating channel can move by swinging and rotating from an inclined position aligned with said tank to receive metal bases therefrom to a horizontal position aligned with said heated vibrating channel to feed the metal bases thereto.

3. In an apparatus including a glueing means as set forth in claim 2, wherein:
- a sensor is disposed to move with said first piston and said bearing head for sensing the presence of a sheet of glass.

4. In an apparatus including a glueing means as set forth in claim 2, wherein:
- said tank is pivotally mounted and comprises an electromagnetic vibrator.

5. An apparatus for glueing metal bases onto glass substrates, comprising:
- a conveyor for receiving glass substrates thereon;
- a loading means disposed at one end of said conveyor for loading glass substrates onto the conveyor;
- a glass substrate positioning means disposed along said conveyor for precisely positioning the glass substrates thereon;
- glueing means for glueing the metal bases onto the glass substrates, said glueing means being disposed below said conveyor and comprising a vertically moveable support for moving a metal base toward a glass substrate and pressing the metal base thereagainst;
- feeding means for feeding the metal bases to said vertically moveable support;
- storage means for storing a supply of metal bases; and
- supplying means for supplying the metal bases from said storage means to said feeding means;
- wherein said loading means comprises a tilting device for tilting a glass substrate from a substantially vertical position to a substantially horizontal position on said conveyor, said tilting device having arms for receiving a glass substrate hingedly connected to a tilting device body.

6. The apparatus as set forth in claim 5, wherein:
- said glass substrate positioning means comprises a plurality of glass substrate bearing shoes for vertically moveably supporting the glass substrate, front stops for positioning the glass substrate in the direction of conveyance and side stops for positioning the sides of the glass substrate, wherein said side stops are mounted to laterally sliding blocks for movement lateral to the direction of conveyance and lateral positioning of the glass substrate.

7. An apparatus for glueing metal bases onto glass substrates, comprising:
- a conveyor for receiving glass substrates thereon;
- a loading means disposed at one end of said conveyor for loading glass substrates onto the conveyor;
- a glass substrate positioning means disposed along said conveyor for precisely positioning the glass substrates thereon;
- glueing means for glueing the metal bases onto the glass substrates, said glueing means being disposed below said conveyor and comprising a vertically moveable support for moving a metal base toward a glass substrate and pressing the metal base thereagainst;
- feeding means for feeding the metal bases to said vertically moveable support;
- storage means for storing a supply of metal bases; and
- supplying means for supplying the metal bases from said storage means to said feeding means;
- wherein said vertically moveable support comprises a bearing head for bearing bases thereon having an electric resistor for maintaining a suitable glueing temperature of the metal bases, and wherein said glueing means further comprises a counter-pushing piston for providing pressure and backing on the glass substrate on the side thereof opposite to which the metal base is being glued.

* * * * *